United States Patent

Arnold et al.

[11] Patent Number: 5,850,455
[45] Date of Patent: Dec. 15, 1998

[54] DISCRETE DYNAMIC POSITIONING OF AUDIO SIGNALS IN A 360° ENVIRONMENT

[75] Inventors: Glenn Arnold, Knoxville, Tenn.; Daniel Bates, Culver, Calif.

[73] Assignee: Extreme Audio Reality, Inc., Secaucus, N.J.

[21] Appl. No.: 665,515

[22] Filed: Jun. 18, 1996

[51] Int. Cl.$^6$ ................................................. H04R 5/00
[52] U.S. Cl. ................................................ 381/17; 381/1
[58] Field of Search .............................. 381/17, 18, 104, 381/24, 1, 19, 20

[56] References Cited

U.S. PATENT DOCUMENTS

| | | |
|---|---|---|
| 4,524,451 | 6/1985 | Watanabe . |
| 4,525,855 | 7/1985 | Willcocks . |
| 4,532,647 | 7/1985 | Willcocks . |
| 4,807,217 | 2/1989 | Ide . |
| 5,043,970 | 8/1991 | Holman . |
| 5,181,249 | 1/1993 | Schiller . |
| 5,216,718 | 6/1993 | Fukuda . |
| 5,222,059 | 6/1993 | Holman . |
| 5,339,363 | 8/1994 | Fosgate ..................................... 381/17 |
| 5,341,430 | 8/1994 | Aulia . |
| 5,371,799 | 12/1994 | Lowe et al. .............................. 381/17 |
| 5,386,082 | 1/1995 | Higashi ..................................... 381/17 |
| 5,487,113 | 1/1996 | Mark et al. . |
| 5,500,900 | 3/1996 | Chen et al. ............................... 381/17 |
| 5,521,981 | 5/1996 | Gehring .................................... 381/17 |
| 5,524,054 | 6/1996 | Spille . |
| 5,579,396 | 11/1996 | Iida et al. . |

Primary Examiner—Vivian Chang
Attorney, Agent, or Firm—Hecker & Harriman

[57] ABSTRACT

A software algorithm is disclosed which allows audio signals to be positioned discretely and dynamically in a 360° environment, the center of which is assumed to be the position of the user-listener. The algorithm includes: a) proprietary knowledge of the sound sources (such as a synthesizer chip); b) proprietary knowledge of the number of independently addressable couplers (i.e. how many speakers are employed); and c) a software driver incorporated on a host, computer, or a stand-alone device which includes the algorithm for routing the sound sources to the transducers at the proper volume levels. In a preferred embodiment of the invention, the algorithm functions by controlling the amplitude attenuation of each source as it is coupled to the transducers, and the relationship of the amplitudes sent to each transducer by means of reference values contained in a matrix table native to the algorithm. By changing the amplitude attenuations in accordance with the table of values, the perceptual location of each source can be changed within the 360° environment, such that the listener is immersed within the audio environment. The method of the invention, and the matrix operating therewith, will be seen to simplify computer programming for a surround sound environment, and with user-listener interaction thereof.

18 Claims, 3 Drawing Sheets

DISCRETE DYNAMIC POSITIONING OF AUDIO SIGNALS IN A 360° ENVIRONMENT

FIELD OF THE INVENTION

This invention relates to the digital control of audio environments and, more particularly, to an environment which is of an increased reality to a listener, who is able to interact with the host, (such as a computer) at the same time, as a user thereof.

BACKGROUND OF THE INVENTION

As will be appreciated, advances in audio technology in recent years have proceeded in the direction of making the audio environment "real" to a listener. Thus, monophonic recording and playback evolved into stereophonic recording and playback. This in turn, led to developments in quadraphonic recordings and playback —where the sound, instead of coming out from either left, or right speakers (or a combination of them), came from 4 speakers, replayed out of rear speakers, as well as from front speakers. Enhanced stereo and surround sound developments followed, in the nature of Dolby, AC-3, and other systems, for example, to provide different approaches to immerse a listener in the sound environment.

As these developments came along, computer produced audio programming followed suit in response to demands by users for higher quality sound. This made the job of the computer programmer designing video games and CD-ROMs more difficult, as the need for complex audio production and imaging became necessary. The task of the programmer was further complicated by the desire, and economic necessity to produce games, CD-ROMs, and virtual simulations that would operate on multiple computer platforms such as the Macintosh, IBM compatibles, Nintendo, and Sega.

Thus, a simplified manner of programming the placement and movement of sound within a 360° environment would be desirable, which would not require programmers to sit down and perform complex calculations to have the sound respond to the actions of the user in interacting with the visual aspect of the program. Also, even where there is no user interaction, a simplified manner of programming would be helpful to one trying to develop these games, CD-ROMs, virtual simulations for an enhanced audio environment; and for performance by musicians, audio engineers, etc.

SUMMARY OF THE INVENTION

As will be seen from the following description, this invention generally relates to the discrete dynamic positioning of audio sources around a user-listener sitting in the middle of a 360° environment—which can be best described by assuming the user to be looking at a fixed point, and thus turning in a clockwise or counter-clockwise fashion a full circle (360 degrees), arriving again at the fixed point while being contained within the audio environment the duration of the entire turn. As will also be seen, the focus of this invention is to enable the dynamic manipulation of sounds to be produced within that environment. As will be appreciated by those skilled in the art, this alteration can be effected through computer programming, as an example, or through user interaction in which events are prompted to the computer by the user, who instantaneously alters the listening environment. In such manner, a realistic, interactive audio environment can be established.

As will become clear from the description below, the present invention operates in addressing several of the weaknesses as is associated with current audio system designs. First, the hardware limitations of those designs are overcome in a manner by which amplitude attenuation is controlled from software that is customizable by the programmer, instead of being statically controlled by hardware or firmware. Secondly, the sound positioning of any voice can be rendered in a 360° plane. Thirdly, it will be appreciated from the description that the data streams that determine the sound output can be modified, and added to by the actions of the user-listener without disrupting their translations. And, as will be seen, the invention creates a fluid and structured manner for addressing the need of placing sounds in a listening environment which does not exist in current audio system designs.

To accomplish this, it will be seen from the following description that a software algorithm or driver, is utilized, on a "host", such as a personal computer or a dedicated audio processor, positioned at a step prior to the sound generation, determining the playback placement of the individual voices across the four or more sound outputs, which delivers the source in a known fashion to any or all transducers to which the outputs are connected. In accordance with the invention, such software driver receives a sound placement value which it compares to a known table of values, and sends those values to the couplers for proper placement of the sound.

In an alternative system that incorporates static surround sound technologies (Dolby Pro Logic, AC-3...) the driver intercedes prior to the decoding of the data stream to act as a data stream interpolator by decoding the data stream, altering the data stream as necessary to instigate new audio amplitude attenuation values, adding additional sound information, and encoding the altered data stream back to the format expected by the surround sound processor. If desired, the driver can re-code the altered data stream—for use on non-AC-3 systems—to execute using the known number of couplers existing on the system in use.

Alternatively, and as will be appreciated, the driver can also send the translated data stream according to the preferred embodiment straight to the transducer when so configured, thereby permitting the existing data stream to remain intact if so desired by the user, or to allow it to be altered by the software driver and "updated" to the new environment if so desired during user interaction with the system.

In carrying out the teaching of the invention, a method is described which allows the computer programmer to merely specify a number identifying a location within a known pattern for positioning the sound desired in a specific embodiment employing four speakers, the center of which is assumed to be the position of the user-listener. Once that number is set forth, a matrix established according to the invention automatically places the sound in the field, by establishing amplitude attenuations of the sound reproduction by the speakers. The matrix contains a plurality of Tables, the first two being defaults used by the matrix if no other Table is defined by the computer programmer.

In one embodiment of the matrix described (Table 1), 128 points are used to represent locations on a 360° circle, where #0 is straight behind the user, and #64 is straight ahead. A data stream programmed for use with this driver would then present a source data stream to the driver containing a message specifying a location (as an example "location #0"). The driver receives this message, looks in the matrix for the attenuation values of location #0, sets the attenuation values of the sound source to the values specified by the matrix, which is then produced at the proper outputs and volumes. Assuming a data stream issues multiple location numbers sequentially, the attenuation levels dynamically change to match each of the new values presented to the driver by the data stream. If the second default Table (Table 2) is employed, the data stream represents not only locations on the circumference of the circle, but locations closer to, or further from the user. In this manner, the computer programmer need only specify the location number according to the applicable table being utilized, and the driver and matrix take over themselves in establishing the needed amplitude attenuations to perceptually locate the sound in the 360° field. The programmer definable Table can be of any configuration to achieve the desired effect, such as being inside of a tunnel. Once a Table is loaded into the matrix, can be dynamically modified by the program, allowing the driver to access different table configurations at any given instance.

As will also be appreciated, where there is user interaction with the video game, CD-ROM, etc, the computer programmer simply can define the location by the matrix number, along with a variable, controlled by the user through a joystick, gun, mouse, head set, or other means in providing a new location for the sound to be positioned at. Such control merely changes the location number specified to a different one, also present in the matrix, where the amplitude attenuations are established once again to control the sound sources passing through the couplers.

As will be appreciated, the method of dynamically locating these audio signals in the 360° environment with either embodiment of the invention operates independently of the type of computer being employed, so as to enable a programmer to more easily port a product to other computer platforms. In such manner, a "standard" can be set for each program for playback through different types of computers.

While the method and matrix of the invention will be understood in using the Musical Instrument Digital Interface (MIDI) standard of controlling audio in musical instruments, synthesizers, and computer sound generation, in utilizing 1 Byte words (128 values) to define the matrix and driver, other standards offering additional values may be used if developed in the future.

BRIEF DESCRIPTION OF THE DRAWING

These and other features of the invention will be more clearly understood from a consideration of the following description, taken in connection with the accompanying drawings, in which.

DETAILED DESCRIPTION OF THE DRAWING

Figure 1:
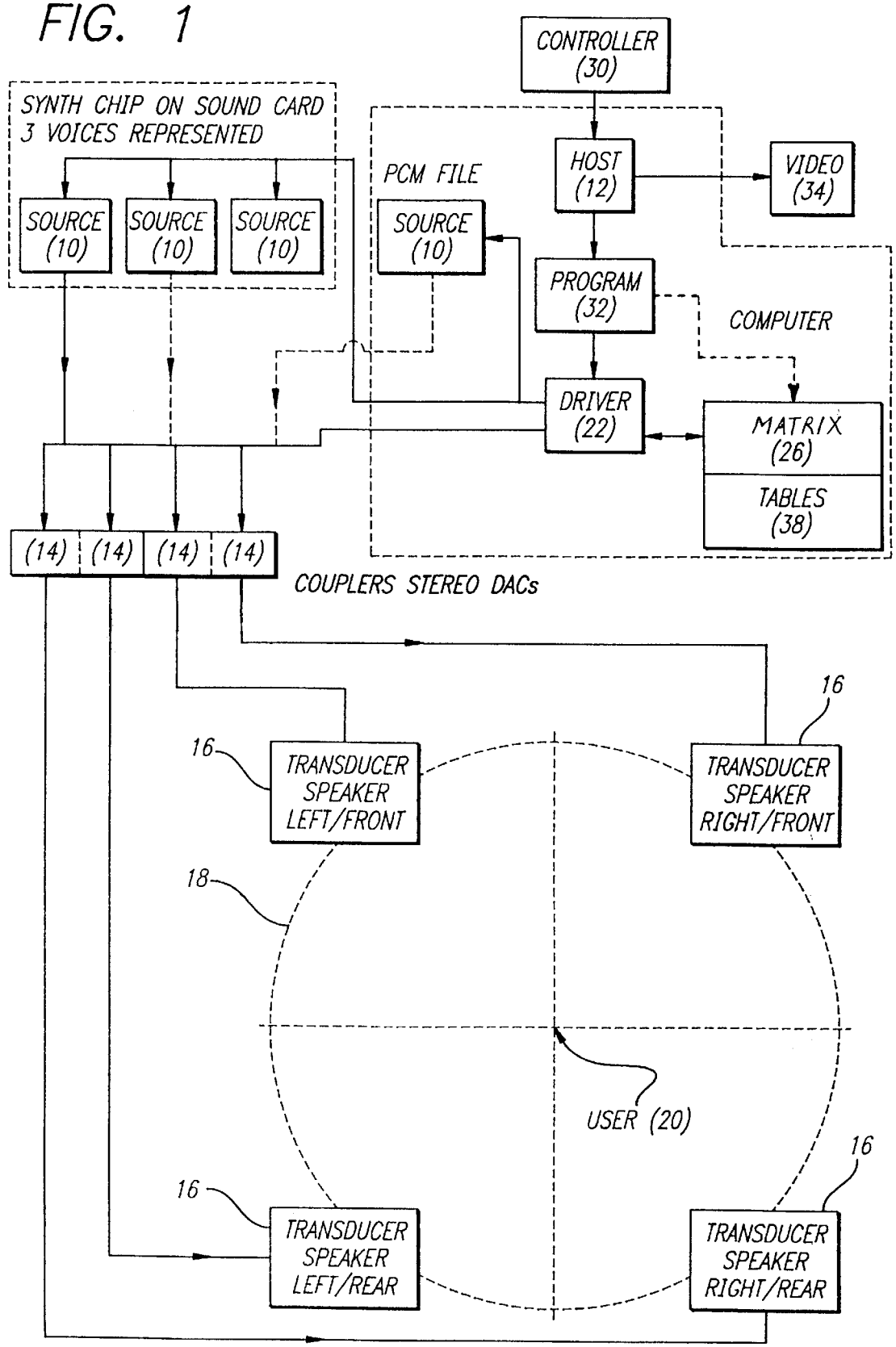
FIG. 1 is a block diagram of an audio environment and system helpful in an understanding of the present invention.

In FIG. 1 one or more individual sound sources 10, defined as any sound embodied in a data stream, such as the voices on a synthesizer chip, a pulse code modulation (PCM) file, etc. The sound source 10 is controlled by, and normally integral with, a host 12, and is connected via couplers 14 (such as D/A converters, digital line drivers, etc.) to a plurality of transducers 16, which translate the delivered source in a known fashion. The audio environment 18 is illustrated with a user 20 at its center, and is depicted with four transducers 16 situated one at each corner of the environment 18. Of course, any number of users can be included within the 360° environment 18, with all aspects of heading and bearing being maintained as in real life, so that users standing in the center receive audio data representing that which would normally be presented to a user 20 standing in the center of the environment 18. As will be appreciated, the audio environment 18 is limited only by the size and placement of the transducers 16, as supported by the system.

A software algorithm is utilized which includes proprietary knowledge of the sound sources 10 and proprietary knowledge of the number and types of couplers 14, and a software driver 22, located on the host 12 which enables communication between the sound source 10 and the couplers 14. This algorithm functions by controlling the amplitude attenuations of each individual sound source 10 as it passes through the couplers 14, and the relationship of the amplitude sent through each coupler 14 by reference values contained in a matrix 26 native to the algorithm. As will be seen from FIGS. 2 and 3, by changing the amplitude attenuations, the perceptual locations of each sound source 10 can be changed in the 360° environment, such that the user 20 ends up being immersed in the audio environment.

In FIG. 1, a configuration is shown, with a controller 30, employed by the user 20 sitting in the center of the environment, holding onto a joystick, mouse, gun, or wearing a controlled headset, or otherwise connected to some control device to interact with a computer program 32 which typically sends an output signal to a video display screen 34 and which provides an output signal of a type to instruct the driver 22 to instruct the sound source 10 to produce any given sound at a selected volume level, and instruct the couplers 14 to place that sound at a given point in the 360° environment 18. Such sound source 10 is, as an example, shown connected to 4 couplers 14 which translate generated signals to the four transducers 16, in the audio environment under discussion. While only 4 transducers 16 are illustrated, it will be appreciated that the maximum number utilized is determined by the Matrix Tables 38 and the independently accessible couplers 14 of the system constructed.

As will be appreciated, the audio output signal from the computer program 32 is in the nature of an instruction to the Driver 22, which in turn controls both the sound sources 10, and the couplers 14 to play a particular sound at a certain volume and at a specified coordinate in the 360° environment 18.

In accordance with the invention, the computer program 32 sends the specified coordinate number (as #32 for example) to the driver 22 where it is compared to a Table 38 in the matrix 26 which defines the various attenuation amplitudes for the individual left and right, front and rear transducers 16 in dynamically positioning the audio signal discretely in the 360° environment 18 to which it is assigned. The matrix 26 then, is effective to return the volume ratio to the Driver 22 where the amplitude attenuations for the couplers 14 are addressed. As will be appreciated, such coordinate number initially designed by the programmer at #32 can thus be varied by the controller 30, in changing the location as to where the sound is to be positioned in the 360° environment 18, to allow for user-listener 20 interaction.

Figure 2:
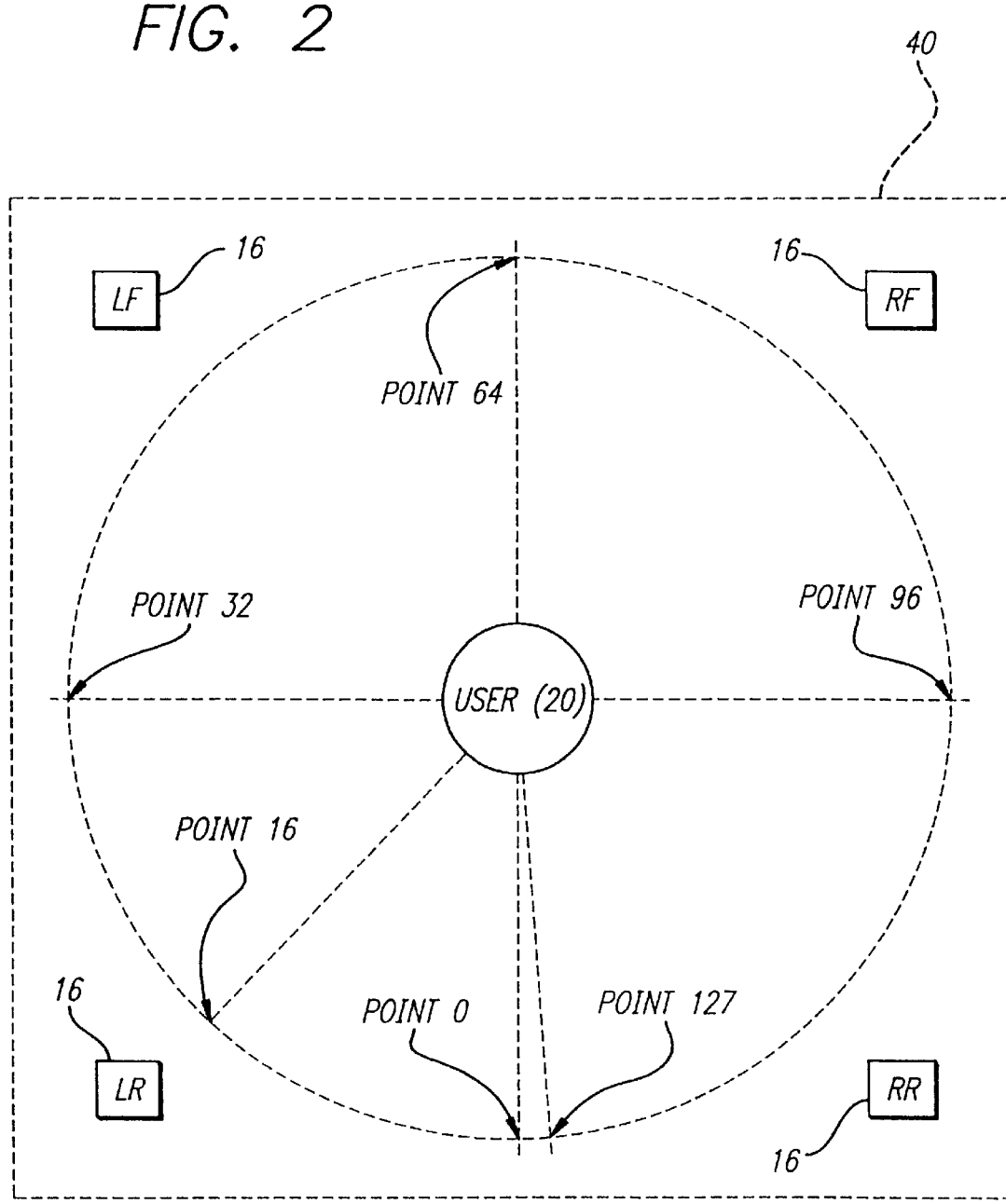
FIG. 2 is an example of one way to implement a matrix relating to a 360° environment, and is considered a "default" matrix automatically loaded by the driver when no other matrix is loaded.
Figure 3:
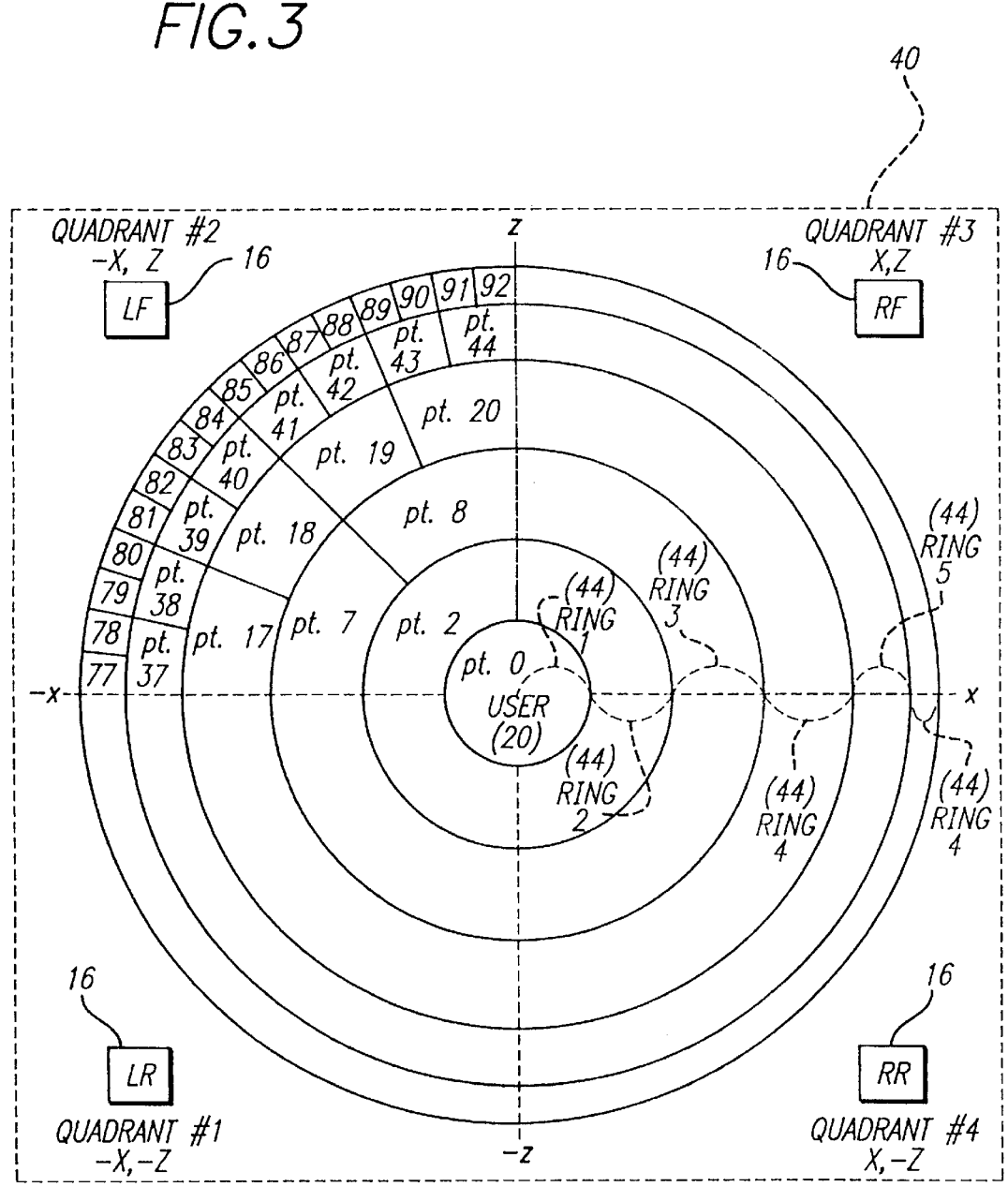
FIG. 3 is an example of another way to implement a matrix, relating to a 3-D environment contained in a 360° sphere, and is considered a "default" matrix automatically loaded by the driver when no other matrix is loaded.

With this understanding that the matrix 26 referenced by the driver 22 can thus be accessed dynamically by the user-listener 20, FIGS. 2 and 3 can be referred to in understanding the implementation and the discrete positioning of the audio signal in perceptually immersing the user-listener 20 in the audio environment.

FIG. 2 shows an audio environment 40 with the matrix 26 accessing a Table(#1) 38, containing the 128 values associated with the MIDI standard (#0–127). Each value or point thus represents an angle of offset from the first point (0) equal to 360° divided by 128, or 2.8125°, such that every 16 points equals a rotation of 45° clockwise around a circle. With position 0 assumed to be straight behind the user 20, with position 64 assumed to be straight ahead of the user 20 (180° offset from point 0), four transducers 16 are shown— Left Front (LF), Right Front (RF), Right Rear (RR), and Left Rear (LR). Thus, the Table 38 contains an array for 128 points, each with four values (LF/RF/RR/LR). As understood, the four transducers 16 are positioned at 90° intervals around the environment, such that LR=point 16, LF=point 48, RF=point 80, and RR=point 112. As also indicated, point 0 is directly between LR & RR, point 32 is directly between LR & LF, point 64 is directly between LF & RF, and point 96 is directly between RF & RR.

Amplitude attenuations can be derived such that the point corresponding to a specific transducer 16 (i.e., point 16 would equal transducer LR) has an array containing full-on for that transducer 16—and its associated coupler 14—and full-off for the other 3 (with full-on being defined as an attenuation of 0; full- off being defined as the maximum attenuation level from which sound output can not be registered from the transducers). Points then directly in-between two transducers 16 (i.e., point 32 is directly between LR & LF) would have an array containing combinative values for the 2 transducers equalling the same db output from an individual transducer, while the other two transducers 16 are set to full-off. The points in-between the corner and mid-quadrant points can then be derived such that as the point value moves from the pair of transducers toward one of the transducers in the pair, the value increases in the array for the transducer being approached until it reaches full-on, and the value decreases in the array for the transducer being moved away from, until it reaches full-off.

The Table(#1) 38 of FIG. 2, will be appreciated to represent a sequential matrix, in which the points are sequentially numbered such that incrementing (or decrementing) the point moves the sound around the circumference of the environment 18. Such environment is typical of stereo-field environments, except that the stereo field extends a full 360°. Distance will be seen to be irrelevant to location, and that the points locating the audio signal are spatially positioned about the 360° field, equidistant from the assumed central position of the user at 20. Since the driver 22 and matrix 26 recognize the 128 values, each incrementing or decrementing unit is effective to dynamically locate the audio signal 2.8125 degrees apart. In such manner, all that the computer programmer need do is specify an instruction that translates to a matrix value at any of the 128 points in defining where the sound is to perceptually appear at. This simply can be done by having the matrix of FIG. 2 as a "pie slice" in establishing the instruction, regardless of what platform of host, computer, 12 is being utilized, and independent of the content of the data stream or volume level selected for that sound source 10. Once the coordinate value is established, the amplitude attenuations for the couplers 14, automatically follow to activate the transducers 16 LF,RF,RR, and LR accordingly positioning the audio signal. If the program designed, as an illustration, calls for the signal to perceptually appear at point #32 in the matrix of FIG. 2, but the user 20 actuates the controller 30 to interact with the program 32 in changing the video output 34 and the relevant audio signal location, to a point #88, then the signal would perceptually appear at that point, at the same volume, through different amplitude attenuations of the signals coupled to those same four transducers 16.

Similarly, the Table(#2) 38 of FIG. 3 is useful in discretely and dynamically positioning the audio signal in the 360° environment 18, but at distances closer to, or further away from the user 20 according to the computer program 32, again by just specifying a coordinate which translates into a matrix value. The emulated 3-D environment of FIG. 3 will be understood to consist of six concentric circles (RINGS 1–6), with the radius of each circle being calculated based on a known maximum distance from the user being the radius of an imaginary seventh ring, and the radius of each of the known six rings being derived from some subtraction of the known maximum distance such that the radii of the rings fits a cubic formula where Y=distance and X=ring. As shown, each RING 44 contains a different number of points, RING #1 having 1 point, RING #2 having 4 points, RING #3 having 8 points, RING #4 having 16 points, RING #5 having 32 points, and RING #6 having 64 points. As will be appreciated, the starting point for each RING 44 is calculated in this manner such that the one point of RING 1=#0, the four points of RING 2=#1–#4, the eight points of RING 3=#5–#12, the sixteen points of RING 4=#13–#28, the 32 points of RING 5=#29–#60, and the sixty-four points of RING 6=#61–#124. As such, 125 points are present in this Table #2, as compared to the 128 points in Table (#1) in FIG. 2.

To implement the matrix of FIG. 3, only the x and z values need be considered, such that the 360° field can be divided as follows: Quadrant #1 includes any point plotted with a negative x, and a negative z value, quadrant #2 is defined by any point plotted with a negative x value and a positive z value, Quadrant #3 is defined by any point with a positive x value and a positive z value, and Quadrant #4 is defined by a point with a positive x value and a negative z value. Four transducers 16 are shown in this environment 18—Left Front (LF), Right Front (RF), Right Rear (RR), and Left Rear (LR). As indicated, each transducer is positioned at the center of a quadrant (LR=1,LF=2,RF=3,RR=4). As will thus be seen, each coordinate in the matrix of FIG. 3 contains an array of four values (LF/RF/RR/LR). The values assigned to each coordinate represent a progressive bleed based on the proximity of each RING 44 to the center user 20, such that RING 6 is calculated as previously described, and RING 1 has the same attenuation level for each transducer 16.

In a manner analogous to that with FIG. 2, the computer programmer provided with the "pie chart" of FIG. 3, simply specifies that instruction coordinate in the program which would correspond to that one point in the field where the audio signal is to be perceptually positioned, a given distance from the user 20, and along the 360° field. By adjusting the controller 30, the user 20 can thereafter change that coordinate and simply interact with the program 32—regardless of the type and manufacture of the computer being employed as the host 12.

As thusly described, the software driver 22 and matrix 26 are positioned prior to the placement of each individual sound source 10 in the environment, and when combined with a static sound data stream (PCM Files, .Wavs), can act as an interpolator by altering the sound data stream as necessary to instigate the new audio amplitude attenuation values, adding in the additional sound information, prior to D/A conversion. In such manner, the software driver is able to manipulate both static sound recordings, and computer generated information.

With the translation of surround sound recordings (Such as AC-3) on the other hand, the information is presented to the driver 22 in a combined format, for translation. Here, the software algorithm "decompiles" the data stream into separate component streams (one for each target coupler), alters the data stream by adjusting amplitude parameters for each component stream, adds sound information to the appropriate data streams, and "re-compiles" the data stream to be sent on to the surround sound processor. The driver can also, if desired, re-code the modified data stream—for use on non-AC-3 compliant type systems—to execute using the known number of couplers 14 existing on the system in use.

As will be appreciated by those skilled in the art, four channel surround sound is developed according to the invention with a simplification to the computer programmer that eliminates the need for complex mathematical calculations for each of the channels employed. Whether the positioning be just around the perimeter of the 360° environment, or within it, closer to or further from the user, all that is required is the specification of the coordinate that corresponds to the point on the Table utilized. It will also be seen that the driver and matrix arrangement can also be employed in other Table designs—as by assigning a coordinant (0) to everything behind the user, and the remaining 127 coordinants to everything in front of the user—as in two-channel stereo, where separation then becomes at increments of 180° spread over the remaining 127 slices. Increased sound perception thus can be had compared to the 2.8125° separation available with the pre-set table shown in FIG. 2.

While there have been described what are considered to be preferred embodiments of the present invention, it will be readily appreciated by those skilled in the art that modifications can be made without departing from the scope of the teachings herein. Thus, whereas, the invention has been described in the context of employing a matrix of 128 values, it will be appreciated that if standards other than MIDI were employed, then the numbers of values can be established to conform with that standard. Similarly, where more than 4 speakers were employed, other assignments of signal amplitude attenuations would be necessitated, in order to control the outputs of each in defining that point where the perceptually appearing sound would be positioned. In either situation, a programmed instruction in the nature of 85±x, for example, could establish, according to the matrix chart utilized, the programmer's definition as to where the sound is to appear in the 360° circular field, with the notation "x" being a variable set to change that location by the users controller 30—either by joystick, gun, mouse or headset control in interacting with the computer program—be it in video game, arcade, CD-ROM, or other "virtual realities" format. For at least such reasons, therefore, resort should be had to the claims appended hereto for a true understanding of the scope of the invention.

We claim:

1. A method for dynamically positioning audio signals in an environment comprising the steps of:
    receiving audio coordinate values for the outputs of a given sound source;
    providing a matrix of values defining individual spatial positions within said environment;
    comparing said coordinate values with said matrix of values to provide attenuated amplitude levels for sound source outputs; and
    mixing signals from said sound source outputs through a coupler to four transducers to be reproduced thereat, wherein different attenuated amplitude levels apply to each of said four transducers.

2. The method of claim 1, also including the step of:
    locating a user-listener within said environment, with said transducers around said user-listener.

3. The method of claim 2, wherein said step of providing a matrix of values provides a matrix of values to include a table of attenuation values for each of said sound source outputs.

4. The method of claim 2, wherein said step of receiving audio coordinate values receives audio coordinate values for a minimum of 4 outputs of a given sound source simultaneously, and at varying levels.

5. The method of claim 2, wherein said steps of receiving audio coordinate values, providing a matrix of values, comparing said coordinate values, and mixing signals are performed in a software program.

6. The method of claim 2, wherein said step of receiving audio coordinate values receives audio coordinate values as provided by a computer program.

7. The method of claim 2, wherein said step of receiving audio coordinate values receives audio coordinate values as provided by a computer program in which each coordinate value can be continuously adjusted by said user-listener.

8. The method of claim 2, wherein said step of providing a matrix of values provides a matrix of values from 0 to N−1, where "0" represents a location on a circle behind a listener of said reproduced audio output signals and where ½N represents a location on said circle in front of said listener.

9. The method of claim 2, wherein said step of receiving audio coordinate values receives audio input signals as a data stream, where said step of comparing said coordinate values separates said data stream into separate component streams, attenuates the amplitude parameters of each component stream, adds any additional sound information into the appropriate streams, and re-combines the amplitude attenuated component streams along with the added information, into a single data stream, and wherein said step of mixing signals includes a step of surround sound processing in coupling said output signals to said transducers.

10. A method for discretely and dynamically positioning audio signals in a 360° environment comprising the steps of:
    First, receiving audio coordinate values for the outputs of a given sound source;
    Second, providing a matrix of values defining individual spatial positions within said 360° environment;
    Third, comparing said coordinate values with said matrix of values to provide attenuated amplitude levels for sound source outputs; and
    Fourth, mixing signals from said sound source outputs through independently controllable couplers to a plurality of transducers to be reproduced thereat;
    Fifth, locating a user-listener within said 360° environment, at the center of said plurality of transducers, wherein said first step receives audio input signals as a data stream, where said third step separates said data stream into separate component streams, attenuates the amplitude parameters of each component stream, adds any additional sound information into the appropriate streams, and re-combines the amplitude attenuated component streams along with the added information, into a single data stream, and wherein said fourth step includes a sixth step of surround sound processing in coupling said output signals to said transducers.

11. An apparatus for dynamically positioning sound sources about a field comprising:
   a matrix of N values, which corresponds to levels of amplitude attenuation for coordinate values, in providing audio output signals to a coupler for signal processing to dynamically and individually spatially position sound sources about a field surrounding a user-listener, wherein said coordinate values are compared with said matrix of N values to provide said levels of amplitude attenuation, wherein four transducers are provided with individually processed audio output signals for reproducing sound thereat, wherein different attenuated amplitude levels apply to each of said four transducers.

12. The matrix of claim 11 where N=128.

13. The matrix of claim 11 for spatially positioning said sound sources about said field equidistant from assumed position of said user-listener.

14. The matrix of claim 11 for spatially positioning said sound sources about said field, and of pre-selected distance from said assumed position of said user-listener.

15. The matrix of claim 11 wherein said matrix is incorporated in a software program.

16. The matrix of claim 11 wherein said field is a 360° field.

17. The matrix of claim 16 wherein said coupler comprises at least 4 couplers.

18. The matrix of claim 17 wherein said user-listener is located at a center of said field.

* * * * *